US007111537B2

(12) United States Patent
Vallone

(10) Patent No.: US 7,111,537 B2
(45) Date of Patent: Sep. 26, 2006

(54) MITER SAW ATTACHMENT

(76) Inventor: David Allen Vallone, 1671 Ruie Rd., North Tonawanda, NY (US) 14120

( * ) Notice: Subject to any disclaimer, the term of this patent is extended or adjusted under 35 U.S.C. 154(b) by 135 days.

(21) Appl. No.: 10/360,287

(22) Filed: Feb. 7, 2003

(65) Prior Publication Data

US 2004/0154450 A1 Aug. 12, 2004

(51) Int. Cl.
*B62D 5/03* (2006.01)
*B62D 7/02* (2006.01)

(52) U.S. Cl. ...................... 83/581; 83/468.1; 83/471.3; 83/490

(58) Field of Classification Search ............... 83/468.1, 83/581, 467.1, 471.3, 490, 468.3; 269/303, 269/315
See application file for complete search history.

(56) References Cited

U.S. PATENT DOCUMENTS 2,587,025 A * 2/1952 Beck et al. ................. 269/146
4,281,827 A 8/1981 Horwath
4,346,636 A 8/1982 Taylor
4,429,601 A 2/1984 Taylor
4,743,004 A 5/1988 Kloss
4,875,399 A 10/1989 Scott et al.
5,018,562 A * 5/1991 Adams .................... 144/253.1
6,183,188 B1 * 2/2001 Randazzo et al. ....... 414/744.5
6,799,758 B1 * 10/2004 Fries .......................... 269/309

* cited by examiner

*Primary Examiner*—Kenneth E. Peterson
*Assistant Examiner*—Isaac Hamilton
(74) *Attorney, Agent, or Firm*—Hodgson Russ LLP

(57) ABSTRACT

A miter saw attachment for attaching to the fence of a miter saw and for cutting molding, for example crown molding or cove molding, the attachment comprising: a block comprising an angled face and a fence face, with the block defining a mount recess and defining a block opening leading to the mount recess. The mount defining a mount opening with a means for fastening received therein. The mount received in the mount recess. The means for fastening tightened drawing the mount and block to the fence of the miter saw. The molding to be cut is positioned and held against the angled face of the block and cut.

3 Claims, 6 Drawing Sheets

200
201
202
203
204
206
208
216
218
30
32
44
300
302

MITER SAW ATTACHMENT

BACKGROUND

While the task of cutting and installing trim molding in a room is rather straightforward, the task of cutting and installing crown molding and cove molding is more complex, especially at corners where the side walls and the ceiling of a room meet. Many pieces of crown molding and cove molding have been wasted in attempts to cut the crown molding or cove molding at the proper angle for installation in the corner of a room. Thus, the task of cutting and installing crown/cove molding is oftentimes left to skilled carpenters using specialized saws and equipment. Some of these tools include compound miter saws, which have been used with varying degrees of success.

A standard miter saw is a relatively inexpensive tool that comprises a handle connected to a motor and blade assembly which is mounted on a turn table. The turn table is rotatably mounted on a base, and a miter saw fence extends from the base. The motor and blade assembly is pivotally mounted to the turn table, thus the motor and blade assembly can be pivoted towards and away from the base and can be rotated relative to the base. The turn table also defines a slot for accommodating the blade when the blade is pivoted towards the turn table. The miter saw blade is perpendicular to the table during the cut, that is, the standard miter saw only makes 90° angle cuts with respect to the table, regardless of how the handle and blade assembly is rotated. Stated differently, the motor, blade, and table may be rotated to make angled cuts, such that the cut made by the blade is at an angle with respect to the fence, but the blade still cuts at a 90° angle to the table.

The structure of the standard miter saw gives rise to problems when using the standard miter saw to cut crown molding for installation in the corners of a room. The blade of a standard miter saw simply cannot be moved such that it makes an angle of less than 90° with respect to the turn table to make the necessary cuts.

The compound miter allows for perpendicular cuts to be made as described above. Additionally, in a compound miter saw the saw blade can be moved into a position that is at an angle of less than 90° with respect to the table. The compound miter saw can cut crown molding for installation in room corners by moving the blade such that it makes an acute angle (less than 90°) with respect to the table, and pivoting the blade to make the cut. However, even though the compound miter saw can cut crown molding for room corners, it is much more expensive to own and maintain than the standard miter saw. Additionally, the compound miter saw is difficult to use for cutting crown molding for the corners of a room, and the chances of the user making successful cuts every time are, at best, mediocre.

Thus, there is a need for an inexpensive apparatus for allowing miter cuts to be made in crown molding and the like, and which is easy to use and maintain, and which may be readily produced.

SUMMARY

The miter saw attachment attaches to the fence of a miter saw and is used when cutting crown molding or cove molding. The attachment comprises a block comprising an angled face and a fence face, with the block defining a mount recess. The fence face of the block defines a block opening which leads to the mount recess. The dimension of the mount opening is less than the dimension of the mount recess. The mount recess extends through the block and is bounded by internal side walls. The attachment further comprises a mount which defines a mount opening and a sliding recess. The attachment also comprises a means for fastening.

The attachment is attached to the fence of a miter saw. This is accomplished by first passing the means for fastening through the mount opening in the mount and into the sliding recess in the mount. Then the mount is moved into the mount recess defined in the block. Next, the means for fastening is passed through a bore defined in the fence of the miter saw. A nut is used to draw the means for fastening, mount, and block towards the fence. During the tightening process the mount may be adjusted to accommodate differently sized pieces of crown molding.

The block may be variously embodied and comprises a top face. The angled face of the block is at a 45°, a 52°, or a 38° angle relative to the top face. Of course, in other embodiments of the attachment, these angles may be different. This allows crown/cove molding of differing shapes to be held against the block and cut by the miter saw. The user simply places the crown molding against the block exactly as it will be installed in the room, makes the cut, and installs the molding. The use of the block eliminates the guesswork out of cutting and installing crown/cove molding, as a successful cut is made virtually every time. The attachment can be used in both standard and compound miter saws.

DETAILED DESCRIPTION

Figure 1:
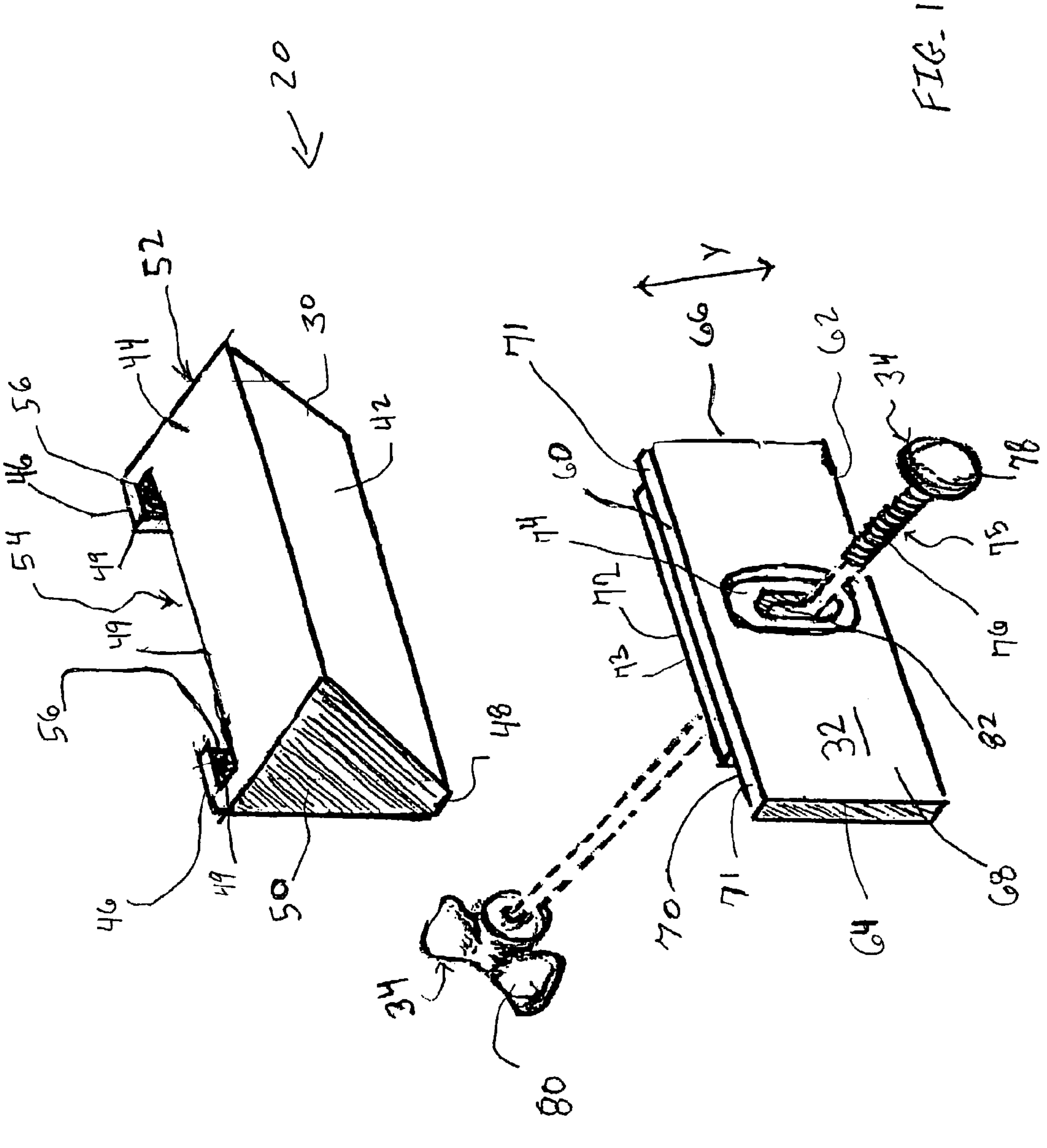
FIG. 1 is an exploded view of the miter saw attachment.
Figure 2:
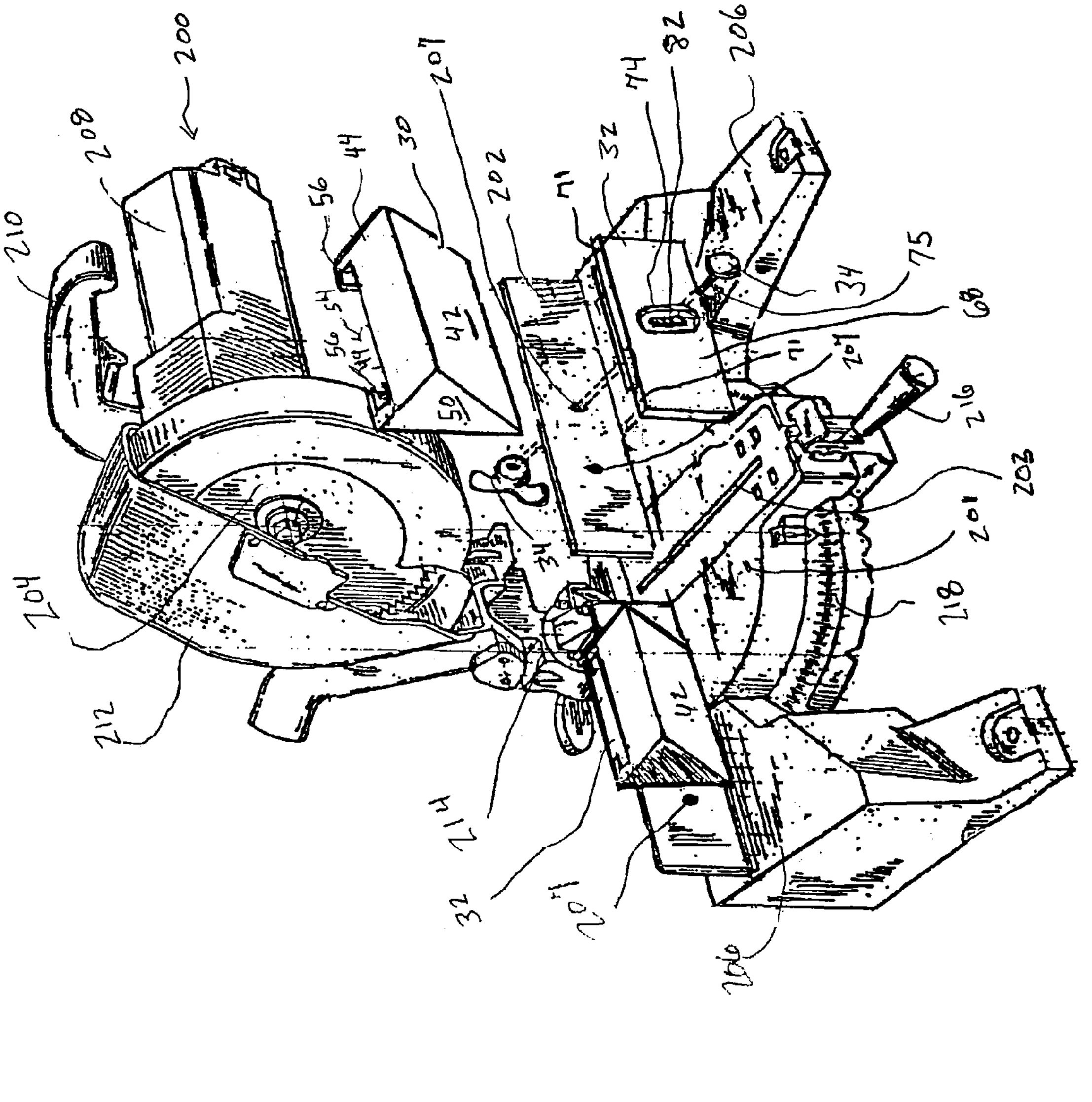
FIG. 2 is a perspective view of the miter saw with the miter saw attachment.
Figure 6:
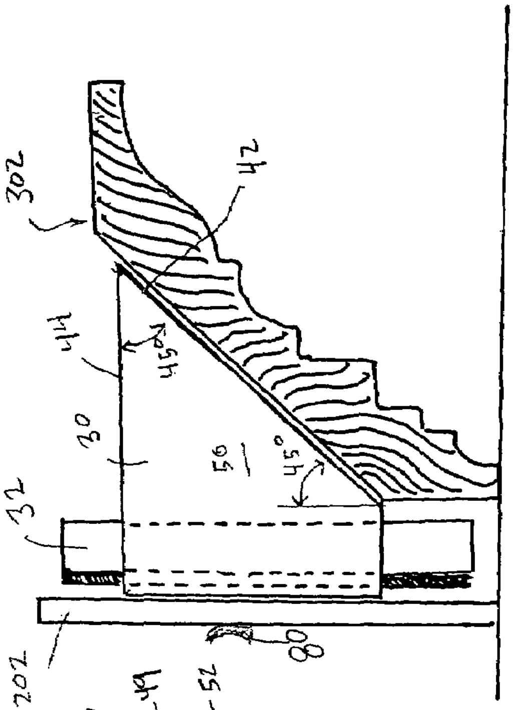
FIG. 6 is a side elevational view of an embodiment of the block.
Figure 7:
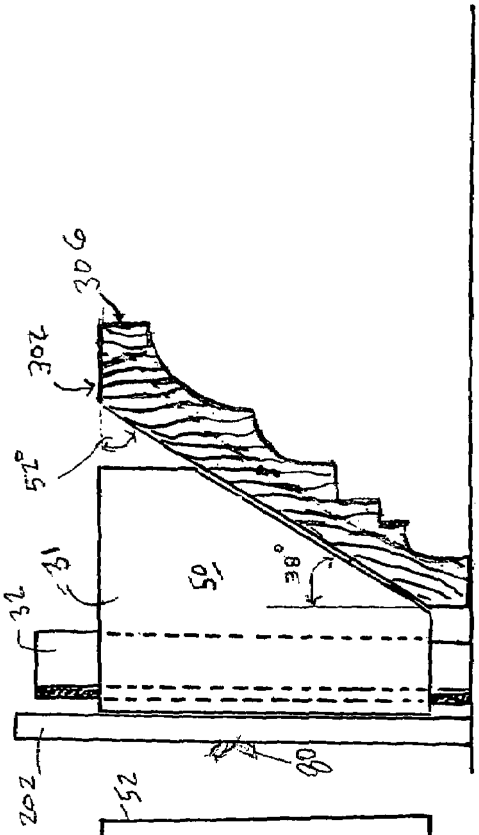
FIG. 7 is a side elevational view of an embodiment of the block.
Figure 4:
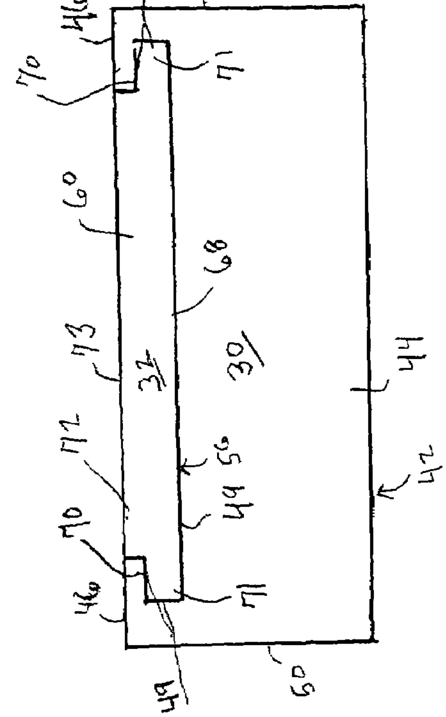
FIG. 4 is a top plan view of the block and mount.

The miter saw attachment 20, shown in FIGS. 1 and 2, is readily attachable and detachable from the fence 202 of a miter saw 200. The attachment 20 may be used on standard miter saws 200 and compound miter saws (not shown). The miter saw attachment 20 simplifies the process of cutting crown molding 302, because crown molding 302 (FIGS. 6–7) cut with a miter saw 200 having the attachment 20 is ready for installation in the corner of the room where the wall meets the ceiling. FIG. 6 shows an elevational view of crown molding 302 and FIG. 7 shows an elevational view of crown molding 302. Indeed, the user 300 (FIGS. 8 and 9) working with the attachment 20 need only place the crown molding 302 on the miter saw 200 just the way it will be installed on the wall and ceiling (not shown), make the cut, and install. The same is true for corners, the user 300 need only hold the crown molding 302 (or cove molding) against the block 30 just as it will appear when installed in the room corner, make the cut, and install.

It is to be understood that other types of molding can be cut using the attachment 20. For example, cove molding (not shown in the figures) may be cut in the same way the crown molding 302 is shown cut in the figures. Cove molding has a smooth curved surface, contrasted with the stepped surface of the crown molding 302. Thus, the present attachment 20 may be successfully used in various mold cutting applications, and its use is not limited to one type of molding.

As shown in FIG. 1, the attachment 20 comprises: a block 30 (block 30), a mount 32; and a means for fastening 34. The means for fastening 34 is moved through the mount 32, and the mount 32 is moved into and held in the mount recess 56 defined in the in the block 30. The means for fastening 34 is then used to attach the mount 32 to miter saw 200 fence 202. To make a cut, the user 300 holds the crown molding 302 (or cove molding not shown) on the miter saw 200 work table 201 and against an angled face 42 of the block 30, rotates the miter saw blade 204 to the left or right, locks it, and makes cuts of 45° for 90° corners, and 22½° for 45° corners found in, for example bay windows, and cuts for any other angle required. The attachment 20 thus allows crown molding 302 (or cove molding) to be cut with a standard miter saw 200 in an accurate and repeatable manner.

Figure 3:
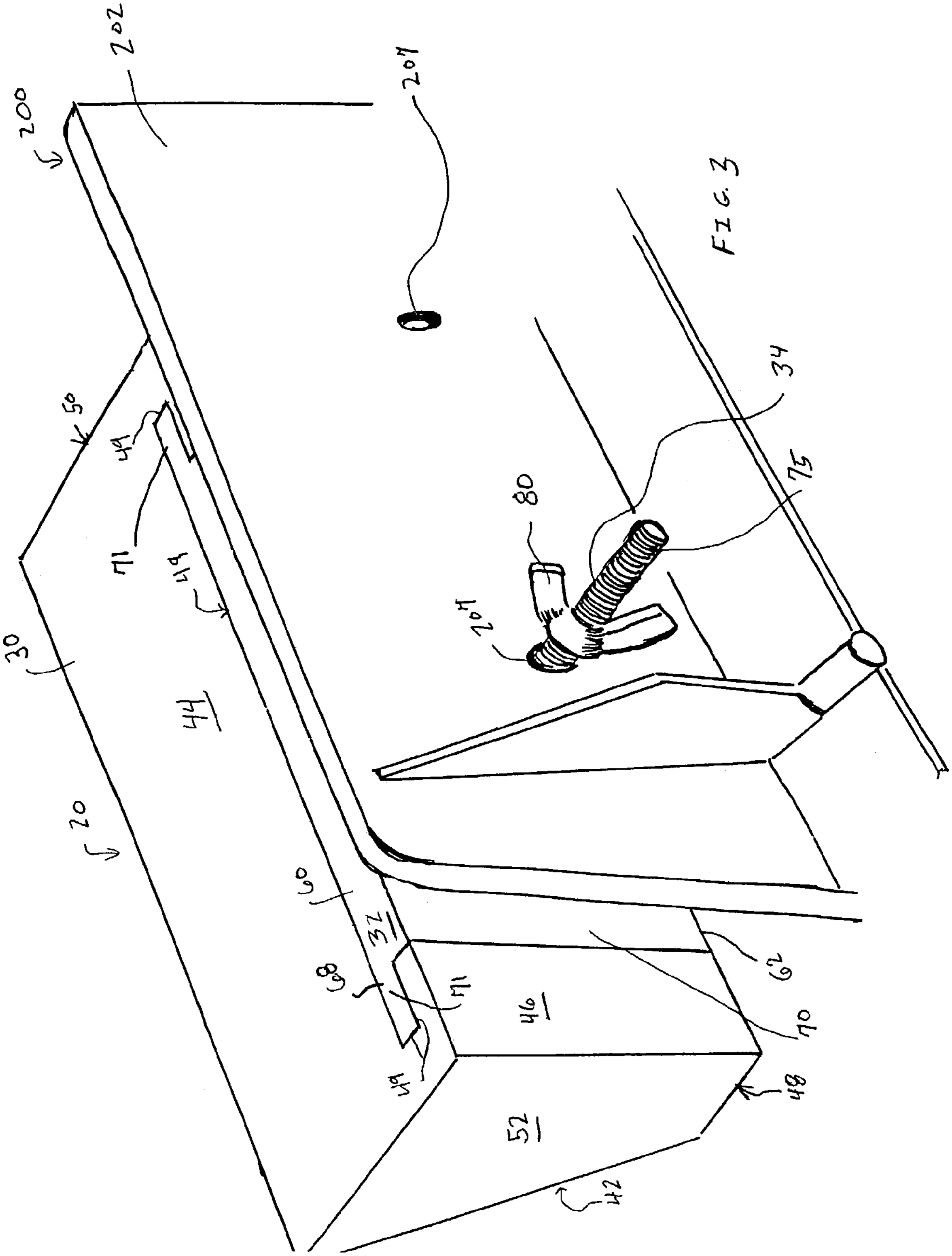
FIG. 3 is a blown up perspective view of the miter saw attachment showing the attachment fastened to a miter saw fence.

The parts of the miter saw attachment 20 are first described, then examples of use of the block 30 are described. Block 30 comprises an angled face 42, a top face 44, a fence face 46, a bottom face 48, and first and second end faces 50,52, respectively (FIGS. 1–3). The fence face 46 of the block 30 defines a block opening 54 which leads to a mount recess 56 defined in the block 30. The mount recess 56 is bounded by internal block walls commonly designated 49 in FIGS. 1–3. The mount recess 56 extends through the top face 44 of the block 30, through the block 30, and though the bottom face 48 of the block 30. The mount recess 56 is for receiving the mount 32 therein in a manner to be described presently. FIGS. 1-3 also show the dimension of the block opening 54 is less than the dimension of the mount recess 56. This is so that the mount 32 can be received in the mount recess 56 defined in the block 30, but cannot move through the block opening 54. This will, as described presently, cause the means for fastening 34 to draw the mount and block towards the fence 202 of the miter saw 200 when the means for fastening 34 is tightened.

Turning now to the mount 32 (FIGS. 1–4), the mount 32 provides for a quick way to attach the block 30 to the miter saw 200 and to adjust the block 30 when it is being attached to the miter saw 200 fence 202. The adjustability of the mount 32 allows differently sized pieces of crown molding 302, or cove molding, to be held against the angled face 42 of the block 30. The mount 32 comprises a top edge 60, a bottom edge 62, a first side edge 64, a second side edge 66, a block side 68 and a fence side 70. Extending from the fence side 70 is a wall 72 comprising a wall face 73. The mount 32 further comprises sliding portions 71 at the first side edge 64 of the mount and the second side edge 66 of the mount, as shown in FIGS. 1–3. The purpose of the sliding portions to be described presently. The block face 68 of the mount 32 defines a sliding recess 74 for accommodating the head portion 78 of the means for fastening 34. A mount opening 82 is defined through the mount 32, extending from the wall face 73 to the sliding recess 74. The mount opening 82 and sliding recess 74 may comprise elongated elliptical shapes as shown in FIG. 1. The mount opening 82 is sized so that the means for fastening 34 can be passed partly through it in a manner described presently. The mount opening 82 is of lesser dimension than the sliding recess 74.

As shown in FIG. 1, the means for fastening 34 may comprise a fastener, for example a threaded bolt or screw 75 comprising a threaded portion 76 and a head portion 78. The sliding recess 74 defined in the mount 32 is sized so that the head portion 78 of the screw or bolt 75 is both receivable therein and can slide therein in the direction indicated by the arrow designated Y in FIG. 1. The mount opening 82 is sized so that the threaded portion 76 of the of the bolt 75 is receivable therein and can slide therein in the direction indicated by the arrow designated Y in FIG. 1. The head portion 78 of the bolt 75 is sized so that it cannot pass through mount opening 82. The purpose of the sliding recess 74 and the mount opening 82 to be described presently. The means for fastening 34 further comprises a nut or wing nut 80 which threads to threaded portion 76.

Attaching the Attachment to the Miter Saw

Figure 5:
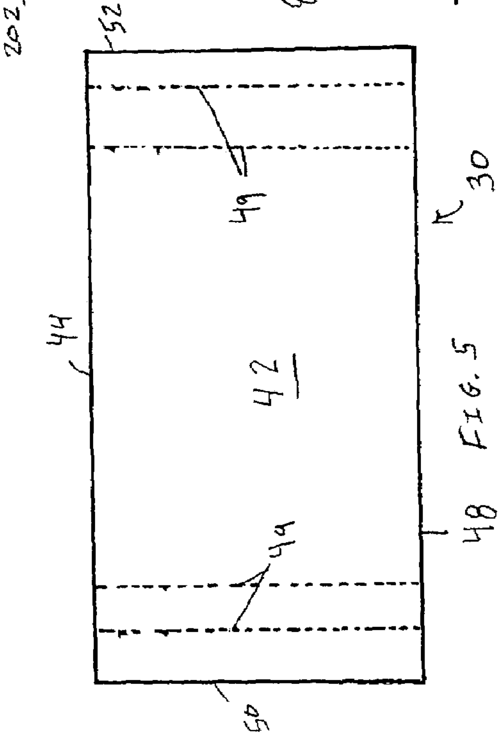
FIG. 5 is a front elevational view of the block and mount.

The process of attaching the miter saw attachment 20 to the fence 202 of a miter saw 200 is both easy and quick. First, the treaded portion 76 of the bolt or screw 75 is moved through the block side 68 of the mount 32. The threaded portion 76 passes through the sliding recess 74 and through the mount opening 82. This movement continues until the head portion 78 of the bolt or screw 75 is moved into the sliding recess 74. Of course, the head portion 78 cannot fit through the mount opening 82. At this point there exists movement or "play" between the means for fastening 34 and the mount 32. In other words, the head portion 78 is movable back and forth in the Y direction in the sliding recess 74, and the threaded portion 76 is movable back and forth in the Y direction in the mount opening 82. This play allows for facilitated alignment and attachment of the mount 32 to both the block 30 and fence 202 in order to accommodate differently sized molding. Next, the mount 32 is slid into the mount recess 56 defined in the block 30. After this is accomplished, the head portion 78 of the bolt 75 is positioned/located in the sliding recess 74 and confined therein by the internal block walls 49 and mount 32. Also, the internal block walls 49 hold the sliding portions 71 of the mount 32 therein, such that the mount 32 is adjustable relative to the block 30. The mount 32 received in the mount recess 56 is shown in FIG. 3, the top plan view of FIG. 4, and the front elevational view of FIG. 5.

The mount 32 is now ready to be attached to the miter saw 200 fence 202. The fence defines predrilled bores 207, as shown in FIGS. 2 and 3. FIG. 2 shows a perspective view of a standard miter saw 200, and FIG. 3 shows a view of the block 30 and mount 32 detailing how the mount 32 attaches to the fence 202. As shown in FIG. 2, the miter saw 200 comprises a blade 204 which is rotated by the motor 208, with a guard 212 for protecting the user 300 from the blade 204. The miter saw 200 comprises a pivot 214 and a pivot handle 210 (handle), so the user 300 can pivot the blade 204 and motor 208 towards and away from the workpiece, in this case the crown molding 302 (or cove molding). The miter saw 200 work table (turn table) 201 defines a slot 203 for receiving the blade 204 during the pivoting movement thereof. The miter saw 200 also comprises a base 206. The adjustment handle 216 allows for the adjustment of blade 204, such that the blade 204 may be aligned with the cutting angle scale 218 shown in FIG. 9. Because this is a standard miter saw 200, the blade 204 can be moved perpendicular to the work table 201.

The mount 32, which is received in the mount recess 56, and the bolt 75 extending from the mount 32 are aligned with the fence 202 and the bore 207. The bolt 75 is passed through the bore 207 and the nut 80 tightened. As the nut 80 is tightened, the mount 32 is drawn towards the fence 202. The sliding portions 71 of the mount 32, which are held between the internal block walls 49, engage the block 30 causing the block 30 to be drawn against the fence 202 as the nut 80 is tightened. During the nut 80 tightening process, the user 300 may adjust the block 30 and mount 32 relative to each other and relative to the fence 202 (as shown in FIGS. 2 and 3) in order to accommodate differently sized pieces of crown molding 302. The user 300 can readily determine where the mount 32 needs to be tightened in order to accommodate the particular piece of crown molding 302 that is to be cut, and tighten the nut 80 accordingly. The continued tightening of the nut 80 draws the fence face 46 of the block 30 and the wall face 73 of the mount 32 into contact with the fence 202, as shown in FIG. 3. It is noted that the block 30 can thus be rapidly attached and detached from the miter saw 200 fence 202.

Cutting Crown Molding

Crown molding 302 and cove molding (not shown) comes in various shapes having assorted cross sections, but two of the most common configurations of crown molding 302 molding have the cross sections shown in the side elevational views of FIGS. 6 and 7. In a first embodiment of crown molding 302, the crown molding 302 makes a 45° angle with the ceiling and a 45° angle with the adjacent side wall (FIG 6). In a second common embodiment of crown molding 302, the crown molding makes 306 makes a 52° angle with the ceiling and a 32° angle with the adjacent side wall as shown in FIG. 7. The crown molding 306 shown in FIG. 7 may be flipped such that it makes a 38° angle with the ceiling and a 52° angle with the adjacent side wall. In order to cut crown molding 302 having these different shapes, one of several embodiments of the block 30 is used. Additionally, for custom jobs a block 30 could be made with different angles, all such blocks being within the scope of the miter saw attachment 20. As previously described, cove molding may be cut in the same manner.

Figure 8:
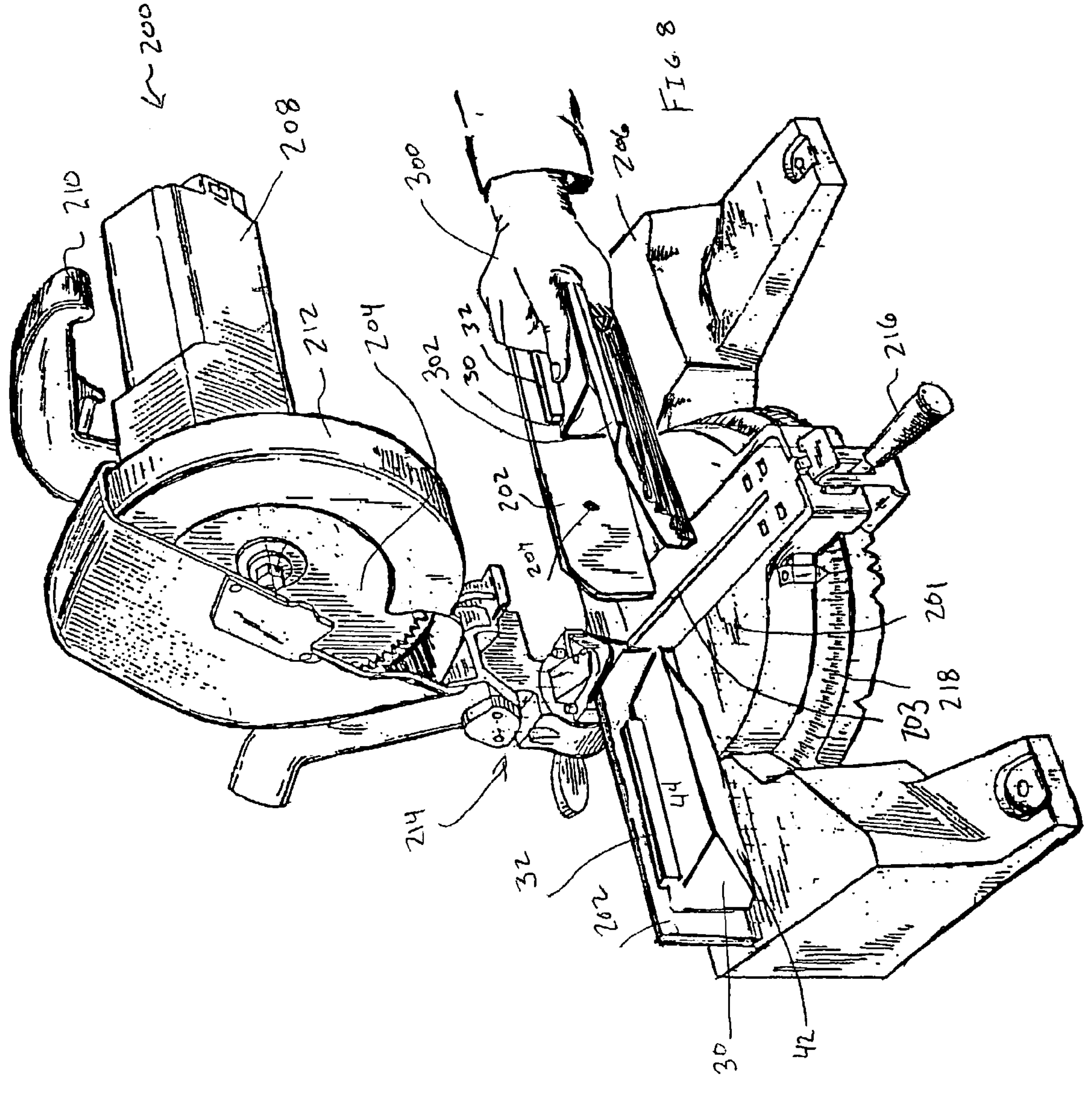
FIG. 8 is a perspective view of the miter saw attachment installed on a miter saw.
Figure 9:
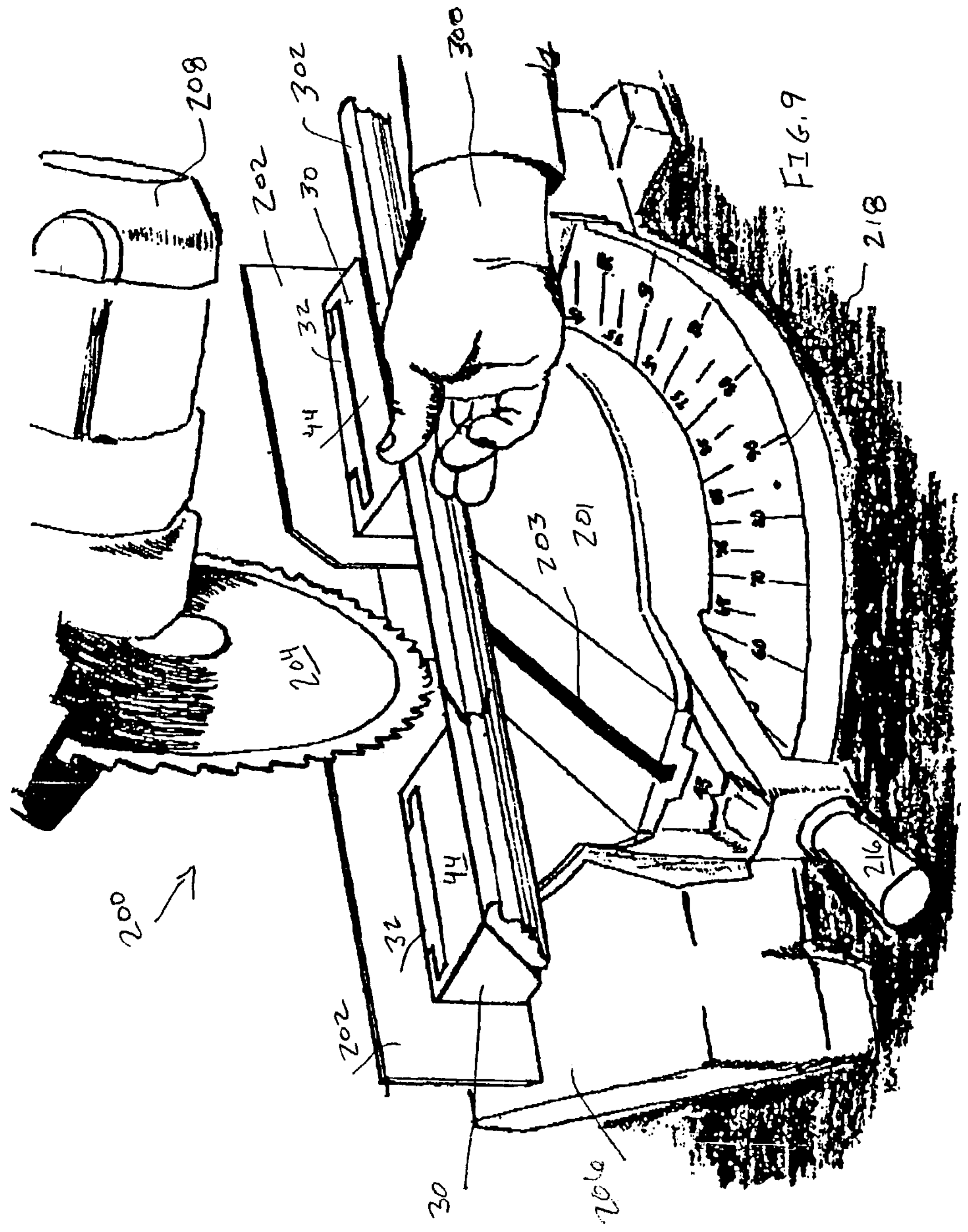
FIG. 9 is a perspective view of the miter saw attachment showing crown molding being cut at a 45° angle.

In the embodiment of the block 30 shown in FIG. 6, the crown molding 302 is the type which makes a 45° angle with a ceiling (not shown) and a 45° angle with the adjacent wall (not shown). This is designated/called 45°-45° crown molding 302. Here, the block 30 top face 44 makes a 45° with the block 30 angled face 42, and the angled face 42 is at a 45° angle relative to the mount 32. Thus in this embodiment, the block 30 is a 45°-45°-90° angle block as shown. A user 300, as shown in FIGS. 8 and 9, takes the piece of crown molding 302 and holds it against the angled face 44 of the block and makes the cut by pivoting the miter saw 200 downward. After the user 300 makes the cut, the crown molding 302 can be installed to the ceiling and wall exactly as it appeared when it was cut by the miter saw 200. For cutting molding to be installed in the corners of the room, the user 300 takes the adjustment handle 216 and aligns the miter saw blade 204 with the cutting angle scale 218, in this case the 45° mark (FIG. 9). The user 300 holds the 45°-45° crown molding 302 against the miter saw attachment 20, pivots the blade 204 towards the table 210, and makes a substantially perfect cut through the 45°-45° crown molding 302. This molding 302 can then be installed in the corner of the room. The fact that the 45°-45° crown molding 302 is cut in the miter saw 200 exactly how it will appear when installed on the ceiling and wall facilitates the process. This also take much of the guesswork out of the process of cutting and installing crown molding 302.

FIG. 7 shows another embodiment of the block 31. Here, the block 30 is used for cutting 52°-38° crown molding 306. This type of crown molding 306 makes a 52° angle relative to the top face 44 of the block 30, and a 38° angle relative to the mount 32. The block 31 is a 52°-38°-90° angle block 31 as shown. The same process is used to cut this crown molding as described above for the 45°-45°-90° angle block 30. Again, the user 300 can see the cut being made in the crown molding 306 and look at the ceiling wall where it will be installed. The fact that 52°-38° crown molding 306 is cut in the miter saw 200 exactly how it will appear when installed on the ceiling and wall facilitates the process. This also take much of the guesswork out of the process of cutting and installing crown molding 306. If the user 300 wants to cut crown molding 306 that makes a 38° angle with the ceiling and a 52° with the adjacent wall, the user 300 need only remove 52°-38°-90° angle block 31, reverse it, and attach it to the fence 202.

FIG. 8 shows a perspective view of a user 300 aligning crown molding 302 with the miter saw attachment 20. In this position, the miter saw 200 blade 204 is at a 90° angle relative to the table 201 and is at a 90° angle relative to the fence 202. When the user 300 pivots the blade 204 downward, a cut is made through the crown molding 302. This is how cuts may be made in crown molding 302 which is installed along the walls and ceilings. Of course, the block 30 used depends on the type of crown molding 302 the user 300 is installing.

FIG. 9 shows the miter saw 200 blade 204 at a 90° angle relative to the work table 201 and at a 45° angle relative to the fence 202. Here, the blade 204 makes cuts in the crown molding 302 which is going to be installed in the corners of the room. The blocks 30 on the miter saw 200 can be either of the above-described blocks 30, or some other embodiment of the block 30. The blocks 30 ensures that the crown molding 302 is cut at the substantially the exact angle, thus providing for a substantially perfect cut every time, while at the same time leaving little room for guesswork and/or error.

The block 30, mount 32, and means for fastening 34 may comprises a lightweight durable material, for example: plastic; injection molded plastics; fiberglass; wood; metals; aluminum; and combinations thereof. Also, in other embodiments, the block 30 may comprise angles other than the 45°-45°-90° angle block and 52°-38°-90° angle block 31 shown, as custom jobs may require the fabrication of blocks 30 having different angles, all of these blocks within the scope of the present attachment 20. Also, the block 30 may be attached to and used on compound miter saws.

The miter saw attachment 20 can also be used for coping inside corners of a room.

It will be appreciated by those skilled in the art that while the miter saw attachment has been described above in connection with particular embodiments and examples, the miter saw attachment is not necessarily so limited and other embodiments, examples, uses, and modifications and departures from the embodiments, examples, and uses may be made without departing from the miter saw attachment. All of these embodiments are intended to be within the scope and spirit of the this miter saw attachment.

What is claimed:

1. In combination a miter saw and an attachment for use therewith, the miter saw has a fence and the attachment attachable to the fence and the attachment for holding molding to be cut against, the attachment comprising:

a) a block comprising an angled face and a top face, wherein the angled face is at an acute angle relative to the top face;

b) the block comprising a fence face and the fence face defining a block opening;

c) the block further comprising internal block walls defining a mount recess, the block opening leading to the mount recess;

d) a mount comprising sliding portions, the mount defining a mount opening and a sliding recess, the mount received in the mount recess defined in the block, the mount in a sliding type relationship with the block and held therein by the engagement of the sliding portions of the mount with the internal block walls; and e) a bolt having a head passing through the mount opening and sliding recess such that the bolt head is positioned in the sliding recess between the block and the mount, and the bolt passes through the fence and a nut is threaded to the bolt such that when the bolt is tightened the mount is drawn to the fence which results in the block being drawn to the fence.

2. The combination according to claim 1 wherein the acute angle is an angle in the range of between about 38° to about 52°.

3. In combination a miter saw and an attachment for use therewith, the miter saw has a fence having an opening and the attachment attachable to the fence to assist in cutting molding, the attachment comprising:

a) a block comprising a fence face, a top face, and an angled face at an acute angle with respect to the top face, the block defining a block opening which leads to a mount recess defined in the block;

b) a mount having a wall face received in the mount recess and the mount defining a mount opening, and wherein the mount is sized so as to be unable to pass through the block opening;

c) a bolt extending through the opening in the miter saw fence and through the mount opening and the bolt having a head that is positioned between the mount and the block, and a nut for drawing the mount to the fence when threadably engaged with the bolt and tightened such that the wall face of the mount contacts one side of the fence and the nut contacts the other side of the fence; and d) wherein the angled face is for holding the molding to be cut against.

* * * * *